United States Patent
Xie

(10) Patent No.: US 8,570,341 B1
(45) Date of Patent: Oct. 29, 2013

(54) METHOD AND SYSTEM FOR ENHANCING COLOR SATURATION

(75) Inventor: Ian Xie, Emeryville, CA (US)

(73) Assignee: Ipera Technology, Inc., San Mateo, CA (US)

( * ) Notice: Subject to any disclaimer, the term of this patent is extended or adjusted under 35 U.S.C. 154(b) by 792 days.

(21) Appl. No.: 12/270,433

(22) Filed: Nov. 13, 2008

Related U.S. Application Data

(60) Provisional application No. 61/012,346, filed on Dec. 7, 2007, provisional application No. 61/012,395, filed on Dec. 7, 2007.

(51) Int. Cl.
*G09G 5/02* (2006.01)
*G06K 9/00* (2006.01)
*H04N 9/66* (2006.01)
*H04N 9/73* (2006.01)

(52) U.S. Cl.
USPC ........... 345/600; 345/589; 345/590; 382/162; 382/163; 382/166; 382/167; 348/638; 348/658

(58) Field of Classification Search
None
See application file for complete search history.

(56) References Cited

U.S. PATENT DOCUMENTS

| | | | | |
|---|---|---|---|---|
| 5,070,397 A | * | 12/1991 | Wedderburn-Bisshop | ... 348/591 |
| 5,450,216 A | * | 9/1995 | Kasson | ......... 358/518 |
| 7,042,520 B2 | * | 5/2006 | Kim | ............... 348/645 |
| 7,532,255 B2 | * | 5/2009 | Zhu | ................ 348/631 |
| 7,746,411 B1 | * | 6/2010 | Balram et al. | ................ 348/649 |
| 2003/0198291 A1 | * | 10/2003 | Gold | ......... 375/240.01 |
| 2007/0248264 A1 | * | 10/2007 | Graves et al. | ................ 382/167 |

* cited by examiner

*Primary Examiner* — Kee M Tung
*Assistant Examiner* — Haixia Du
(74) *Attorney, Agent, or Firm* — Ogawa P.C.

(57) ABSTRACT

Method and system for enhancing color saturation. According to an embodiment the present invention provides a method for enhancing color saturation. The method includes providing a color image characterized by a luminance component and two chrominance components, the color image including a plurality of pixels, the plurality of pixels including a first pixel being characterized at least by a luminance value, a first chrominance value, and a second chrominance value. The method also includes processing the first chrominance value and the second chrominance value. The method further includes determining a saturation level using based on the first chrominance value and the second chrominance value. Moreover, the method includes providing a factor for adjusting the first chrominance value and the second chrominance value, the factor being based on the saturation level. Furthermore, the method includes adjusting the first chrominance value and the second chrominance value using the factor.

29 Claims, 5 Drawing Sheets

METHOD AND SYSTEM FOR ENHANCING COLOR SATURATION

CROSS-REFERENCES TO RELATED APPLICATIONS

This application claims priority to U.S. Provisional Application No. 61/012,395, and Provisional Application No. 61/012,346, both filed Dec. 7, 2007, which are herein incorporated by reference for all purposes.

BACKGROUND OF THE INVENTION

The present application is related to method and system for enhancing video and images. In various embodiments, the present invention provide techniques for enhancing color saturation levels in component color spaces, where images (or frames of videos) are stored in terms of luminance and chrominance levels. In certain embodiments, the present invention provides an algorithm for adjusting color saturation of video in real-time playback. But it is to be understood that embodiments of the present invention have wide range of applicability, which can be applied to video processing, imaging processing, image viewing, and others.

Over the last few decades, technologies for media processing and rendering developed rapidly, especially with the advent of the better computer hardware and telecommunication techniques. In today's world of ubiquitous data communications, ranging from Internet to personal mobile devices, people are sharing more and more media content over communication networks everyday.

Network resources are limited, despite the continuous effort by network companies and providers to improve and expand communication network. Meanwhile, content providers and engineers develop various means to improve media output under the constraints of existing hardware. Among others, various types of compression and enhancement techniques have been developed to improve images and video qualities. These techniques have been used for both contents shared over communication networks and contents stored in various types of media, such as DVD, Blu-Ray discs, CDs, tapes, etc. For each type of application, there are one or more specific and different requirements for the image/video quality. For example, many entertainment-related applications need the playback system to provide better color performance in terms of saturation and hue for the image/video viewers so that the video appear to be more colorful and vivid. This example is more so for low quality video (such as web cam and/or "youtube" videos), where colors are usually dull and uninteresting.

Saturation adjustment is a useful tool in improving video and/or image qualities. By adjusting color saturation, image and/or video can be made to look vivid or muted. There are various conventional techniques exist for saturation adjustment. Unfortunately, these conventional techniques are inadequate for various applications.

Therefore, improved methods and systems for color enhancement are desired.

BRIEF SUMMARY OF THE INVENTION

The present application is related to method and system for enhancing video and images. In various embodiments, the present invention provide techniques for enhancing color saturation levels in component color spaces, where images (or frames of videos) are stored in terms of one luminance and two chrominance levels. In certain embodiments, the present invention provides an algorithm for adjusting color saturation of video in real-time playback. But it is to be understood that embodiments of the present invention have wide range of applicability, which can be applied to video processing, imaging processing, image viewing, and others.

According to an embodiment the present invention provides a method for enhancing color saturation. The method includes providing a color image, the color image being defined by a component color space, the component color space being characterized by a luminance component and two or more chrominance components, the color image including a plurality of pixels, the plurality of pixels including a first pixel being characterized at least by a luminance value, a first chrominance value, and a second chrominance value. The method also includes processing the first chrominance value and the second chrominance value, the first chrominance value and the second chrominance value being characterized by a ratio. The method further includes determining a saturation level using based on the first chrominance value and the second chrominance value. Moreover, the method includes providing a factor for adjusting the first chrominance value and the second chrominance value, the factor being based on the saturation level. Furthermore, the method includes adjusting the first chrominance value and the second chrominance value using the factor, the adjusted first chrominance value and the second chrominance value being maintaining the ratio.

According to another embodiment, the present invention provides a method for enhancing color saturation. The method includes providing a color image, the color image being defined by a component color space, the color image including a plurality of pixels, the plurality of pixels including a first pixel being characterized at least by a luminance value, a first chrominance value, and a second chrominance value. The method also includes processing the first chrominance value and the second chrominance value. Additionally, the method includes determining a saturation level using based on the first chrominance value and the second chrominance value. Furthermore, the method includes providing a factor for adjusting the first chrominance value and the second chrominance value. In addition, the method includes subtracting the first chrominance value and the second chrominance value by an offset value. Moreover, the method includes multiplying the first chrominance value and the second chrominance value by the factor.

According to yet another embodiment, the method includes a method for enhancing color saturation of video in real time. The method includes providing a digital video, the digital video being defined by a component color space. The method also includes processing a frame of the digital video, the frame including a plurality pixels, the plurality of pixels including a first pixel being characterized at least by a luminance value, a first chrominance value, and a second chrominance value. Also, the method includes processing the first chrominance value and the second chrominance value. Moreover, the method includes determining a ratio for the first chrominance value and the second chrominance value. Additionally, the method includes providing a factor for adjusting the first chrominance value and the second chrominance value, the factor being based on the saturation level. In addition, the method includes multiplying the first chrominance value and the second chrominance value by the factor, the multiplied first chrominance value and the second chrominance value being characterized by a same ratio. Furthermore, the method includes outputting the frame within a predetermined time.

According to yet another embodiment, the present invention provides a method for enhancing color saturation. The method includes providing a color image, the color image being defined by a component color space, the component color space being characterized by a luminance component and two chrominance components, the color image including a plurality of pixels, the plurality of pixels including a first pixel being characterized at least by a luminance value, a first chrominance value, and a second chrominance value, first and second chrominance values having a range of between 0 and 255. The method also includes providing a first chrominance value adjustment table, the chrominance value adjustment table including at least 256 values, the 256 values being predetermined based on at least a first parameter, the 256 values being corresponding the range of chrominance values. The method also includes determining a third chrominance value based on the first chrominance value using the first chrominance value adjustment table. Also, the method includes determining a fourth chrominance value based on the second chrominance value using the first chrominance value adjustment table.

It is to be appreciated that embodiments of the present invention provide numerous advantages over conventional techniques. Among others, various techniques according to the present invention are applicable in component color spaces, such as YUV, YCbCr, YPbPr, and YIC spaces, thereby eliminating the needs of conversion between different color spaces and improving efficiency. In addition, it is also to be appreciated that embodiments of the present invention preserve continuity of color saturation level over adjacent pixels on both local level and global level, thereby keeping the whole image consistent. In various embodiments, the present invention takes existing color and/or saturation level into consideration to fine tune the amount of color adjustment being applied. Furthermore, various techniques according to the present invention can be easily implemented in conjunction with conventional systems.

Various additional objects, features and advantages of the present invention can be more fully appreciated with reference to the detailed description and accompanying drawings that follow.

DETAILED DESCRIPTION OF THE INVENTION

The present application is related to method and system for enhancing video and images. In various embodiments, the present invention provide techniques for enhancing color saturation levels in component color spaces, where images (or frames of videos) are stored in terms of one luminance and multiple chrominance levels. In certain embodiments, the present invention provides an algorithm for adjusting color saturation of video in real-time playback. But it is to be understood that embodiments of the present invention have wide range of applicability, which can be applied to video processing, imaging processing, image viewing, and others.

As explained above, conventional techniques for color adjustment, especially the enhancement of color saturation, are inadequate for many of today's applications. These conventional techniques often yield unsatisfactory results. In addition, they are often slow and inefficient for various real-time applications, such as video playback, online playback, etc. In addition, these conventional techniques often cause artificial and undesirable change of the hue in colors.

In most conventional techniques, color adjustments and/or enhancements are performed in RGB color space, which is based on the RGB color model. Any color is defined by the three primary colors: red, green, and blue. Today, the RGB color space is used in a variety of applications, ranging from cameras, television, camcorders, and others. Many color enhancement techniques are designed for the RGB color space, since RGB color space is focused on color, and enhancing color in a color space seems intuitive and straightforward.

Figure 1:
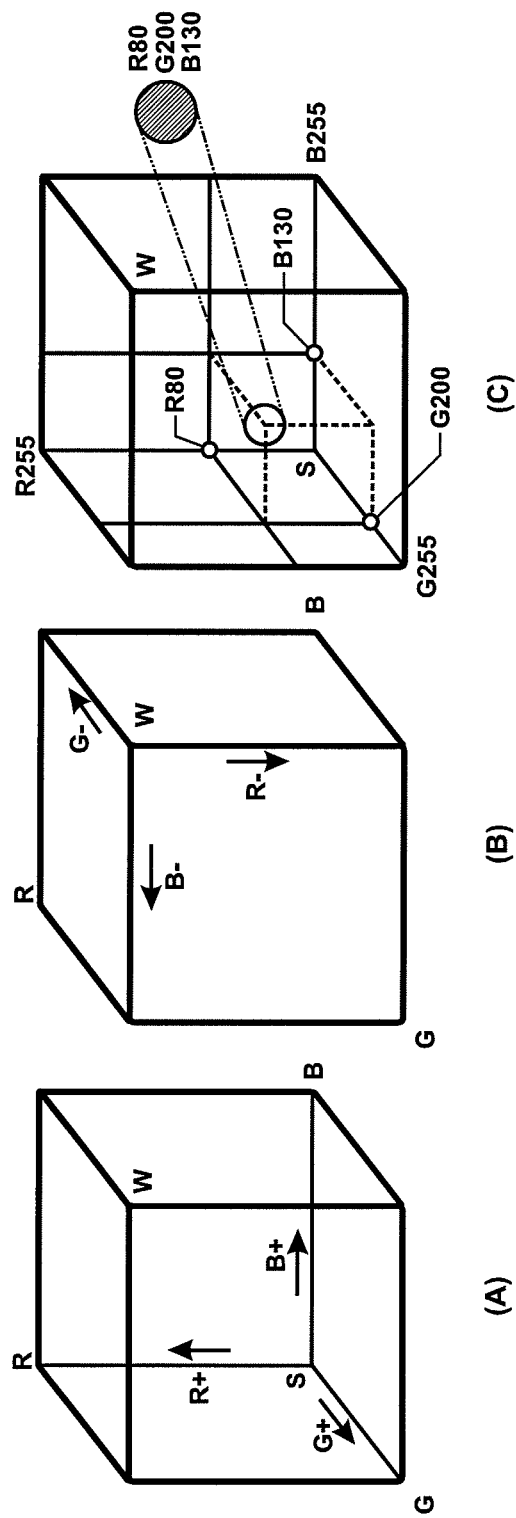
FIGS. 1(a)-1(c) are simplified diagrams illustrating the RGB color space.

FIGS. 1(a)-1(c) are simplified diagrams illustrating the RGB color space. As shown in FIG. 1(a), the RGB cube includes three axes, which respectively indicate the amount red, blue, and green. A color can be defined as position with the RGB cube. For example, a color shown in FIG. 1(c) is defined by a position where R equals to 80, G equals to 200, and B equals to 130.

In a conventional technique for adjusting color saturation, a color pixel is processed and associated with a predetermined "color zone". The color pixel is then modified within this color zone. The color zone allows the hue of the color pixel to be reasonable preserved while saturation of the color pixel to be increased. For example, a image full of color pixels processed using this conventional technique can look more saturated while overall color scheme is somewhat preserved. However, there are various drawbacks with this type of technique.

The "color zone" technique described above often produces undesirable discontinuity within an image. Sometimes, two or more adjacent color pixels, though having substantially similar colors, may be associated with different colors zones. For each pixel, the saturation enhancement is performed using their respective color zones. As a result, the two processed adjacent pixels can be more different from each other in color as a result of saturation adjustment. Often, such differences between adjacent pixels become undesirable artifacts visible on processed images or videos. To reduce this problem, it is often necessary to interpolate and smooth adjacent pixels during the color adjustment process, thereby increasing the computational cost thereof.

In addition to the poor image qualities, the conventional technique as described is inefficient. Usually, it takes many computation steps to determine the color zone for a pixel. If interpolating adjacent pixels is requirement to preserve color continuity and reduce artifacts, additional computations have to be performed.

Despite various drawbacks, various conventional RGB-based techniques are satisfactory for certain applications where RGB color space is used. However, these techniques are inefficient for processing videos and/or images that are encoded in other color spaces, such as YUV color space, YCbCr color space, YIQ color space, YPbPr space, and others. In these types of component color spaces, colors are defined in by a luminance value and two chrominance values. As an example, in YUV color space, Y represent the luminance (or brightness) value, while the U and V components represent chrominance (or color) values. Similarly, in a YCbCr color space, Y represent the luminance (or brightness) value, while the Cb and Cr components represent chrominance (or color) values. These types of component color space are widely used in video applications. For example, the YUV color model is used in the PAL, NTSC, and SECAM composite color video standards. Similarly, the YCbCr color space is widely adopted by various types of video and imaging formats, such as MPEG, H.262, JPEG format, HDTV format (e.g., ITU-R BT.709 standard), and others.

Processing these types of videos using the conventional RGB-based techniques require converting the videos to the RGB color space first and then converting them back. The conversion processes themselves are computationally intensive and inefficient. Therefore, it is appreciated that in various embodiments, the present invention allows color adjustment and/or enhancement to be performed in component color spaces, such as YUV color space, YCbCr color space, YIQ color space, and YPbPr space, without the need of converting to the RGB color space first.

Figure 2:
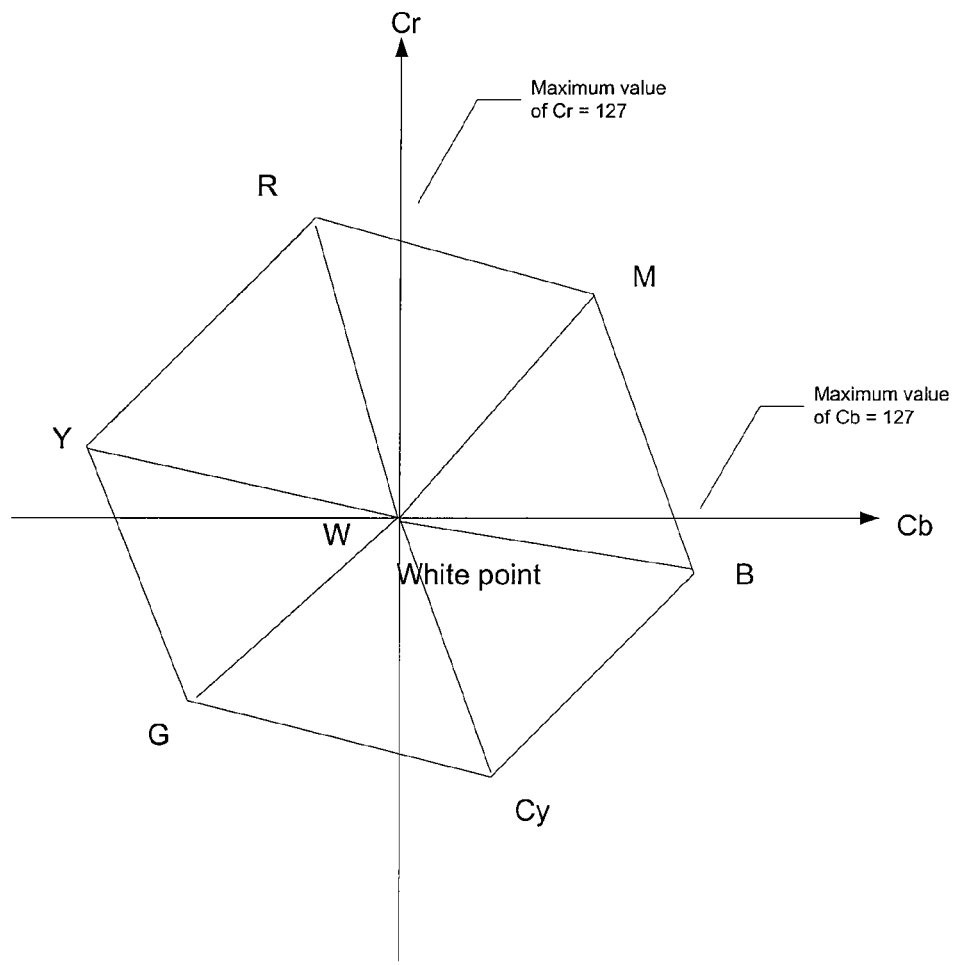
FIG. 2 is a simplified diagram illustrating color representation in YCbCr color space.

FIG. 2 is a simplified diagram illustrating color representation in YCbCr color space. In a YCbCr color space, the Y, representing brightness level, is an 8-bit value ranging from 0 to 255. The Cb and Cr, representing the chrominance levels, are each an 8-bit value which usually represent values from −128 to +127. Since in digital representation, the 8-bit value is usually an unsigned (i.e., non-negative) integer, the value can be from 0 to 255. In this case, an offset of −128 is needed to obtain the actual color value of Cb and Cr for the purpose of color manipulation. For example, a Cb value that is stored using unsigned integer format needs to subtract 128. A value of 200 in the unsigned integer format is actually 72 on the color representation graph illustrated in FIG. 2. A value of 10 in the unsigned integer format is actually −118 on the color representation graph.

As shown in FIG. 2, color is defined by the amount of Cr and Cb components. The entire color spectrum in the Cr and Cb representation is contained in the hexagon shown in FIG. 2. For example, each of the vertex of the hexagon is associated with a specific color: red, magenta, blue, cyan, green, and yellow. The origin of the Cr/Cb graph is the white point, where there are no color components. On the other hand, the closer it is to the edge of the edges of the hexagon, the more vivid or saturated a color appears.

As an example, the following texts of the specification illustrates embodiments the color adjustment techniques performed in YCbCr color space. It is to be understood that various embodiment of the present can be used in other color spaces as well, such as YUV color space, YIQ color space, YPbPr space, and others.

Figure 3:
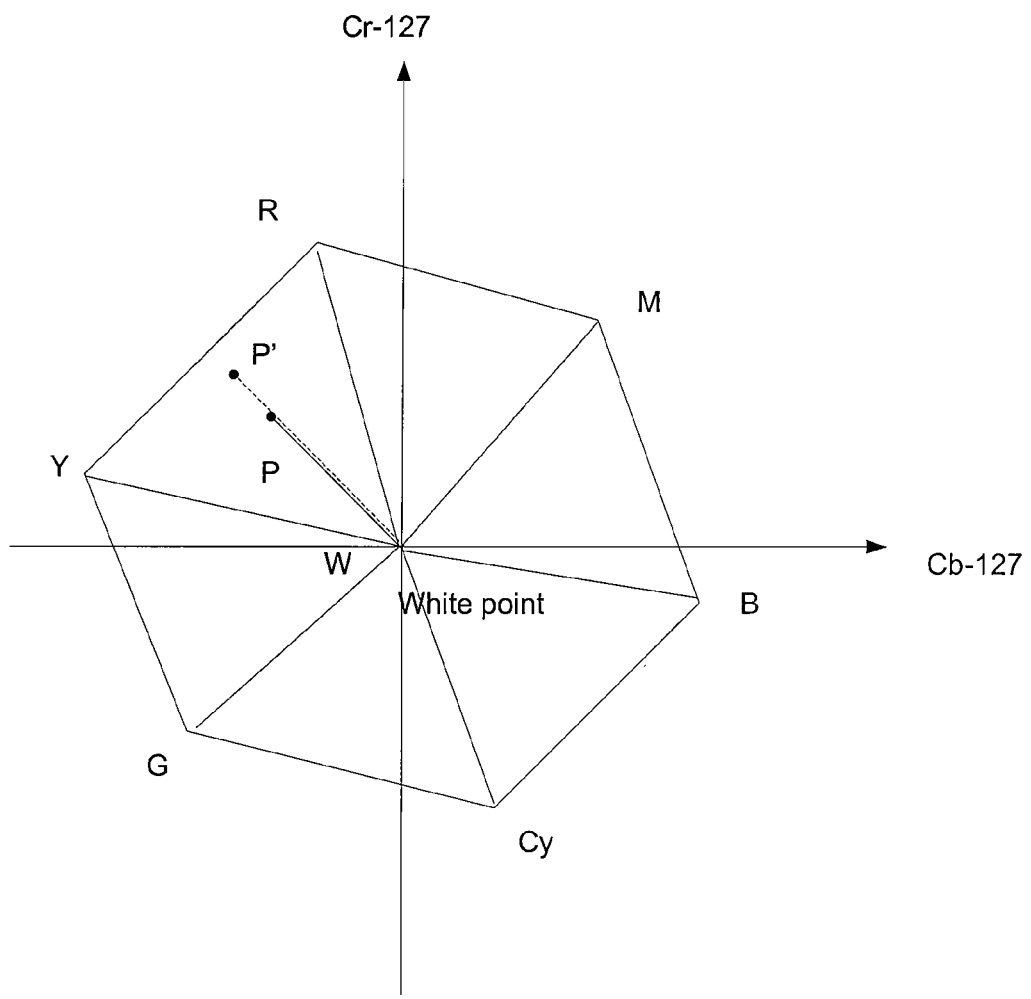
FIG. 3 is a simplified diagram illustrating color adjustment technique according to an embodiment of the present invention.

FIG. 3 is a simplified diagram illustrating color adjustment technique according to an embodiment of the present invention. This diagram is merely an example, which should not unduly limit the scope of the claims. One of ordinary skill in the art would recognize many variations, alternatives, and modifications.

According to embodiment of the invention, the saturation of any point P(Cb, Cr) in the YCbCr space is the distance ‖PW‖ between P and the white point, Depending on the specific application, the distance ‖PW‖ may be calculated in a variety of ways. For example, the distance ‖PW‖ may be calculated as a Euclidean distance, a Manhattan distance, a Maximum distance (‖PW‖=max (Cb, Cr)), etc. By increasing the distance ‖PW‖, the color saturation for the point P(Cb, Cr) will be increased. Conversely, by decreasing the distance ‖PW‖, the color saturation for the point P(Cb, Cr) will be decreased.

It is to be appreciated that embodiments of the present invention adjust the color saturation of without changing the color hue, thereby preserving the color scheme of the original images and/or videos. The hue of the color in the YCbCr space, in various embodiment of the invention, is defined by the angle between directional line $\overrightarrow{WP}$ (i.e., from the white point to the point P) and Cb axis. To increase the amount of saturation for the point P, the P is moved along the direction line $\overrightarrow{WP}$ toward the border of YCbCr hexagon color space. On other hand, to decrease the amount of saturation for the point P, the P is moved along the direction line $\overrightarrow{WP}$ toward the white point of YCbCr hexagon color space.

As explained above, the technique described above is also applicable to other component color spaces, wherein a pixel is presented by a luminance value and two chrominance values. These color spaces include, but not limited to YUV color space, YIQ color space, and YPbPr space. For example, to adjust to color for a point on the YUV color space, the distance ‖PW‖ from white point is derived from U and V values, and the hue angle is between the direction line $\overrightarrow{WP}$ and the U axis. Similarly, to adjust to color for a point on the YPbPr color space, the distance ‖PW‖ from white point is derived from Pb and Pr values, and the hue angle is between the direction line WP and the Pb axis.

To increase the amount of saturation for the point P, the point P is to P' along the direction line $\overrightarrow{WP}$, thereby preserving the same angle between the directional line $\overrightarrow{WP}$ and Cb axis. Since the point P' is closer to the saturation boundary, the point P' has a higher saturation than the point P. As an illustration, the color adjustment performed according to embodiments of the present invention can be expressed by the following equation:

$$\|P'W\| = \beta * \|PW\|, \text{ where } \beta \text{ is non-negative} \quad \text{(Equation 1)}$$

Typically, the value of β is close to 1. By using a β with a value greater than 1, the color saturation of the point P increases. By using a β with a value less than 1, the color saturation of the point P decreases. In an extreme case where β equals to zero, the color information for the point P is disregarded. Typically, to avoid over-adjustment of color saturation, which may cause loss in color fidelity, the value of β is close to 1. For example, to increase saturation, the β value could be 1.1 or 1.2.

To adjust color saturation level based on Equation 1, the value of Cb and Cr are computed using the following equations:

$$(Cb' - 128) = \beta * (Cb - 128) \quad \text{(Equation 2A)}$$

$$(Cr' - 128) = \beta * (Cr - 128) \quad \text{Equation 2B)}$$

In Equations 2A and 2B, the number 128 provides an offset for the Cb and Cr value stored in 8-bit unsigned integer format. Depending on the specific format in which the chrominance values are stored, the offset varies. The goal of the offset is to ensure that 0 in chrominance values represent the white point. For example, in a 4-bit unsigned integer format, the offset is $2^4$ divide by 2, which equals to 8. In a different scenario, where the white point is already represented by the value 0 for chrominance values, the offset is not needed (i.e., offset equals to 0).

Actually obtain the chrominance values after the adjustment, the following equations can be used:

$$Cb' = 128 + \beta(Cb - 128) \quad \text{(Equation 3A)}$$

$$Cr' = 128 + \beta^*(Cr - 128) \quad \text{(Equation 3B)}$$

Equation 3A is provided to calculate the value of Cb', which is the chrominance value Cb after color saturation adjustment is performed. For example, Equation 3A is derived from Equation 2A. Similarly, Equation 3B is provided to calculate the value of Cr', which is the chrominance value Cr after color saturation adjustment is performed. For example, Equation 3B is derived from Equation 2B. During the process of color enhancement, the luminance value is not changed.

As an example, a pixel P is represent by 24-bit value. The 24-bit includes an 8-bit luminance value, two 8-bit chrominance values. Using the color adjustment technique described above, the luminance value is not changed. The chrominance values are modify using the technique described above.

Depending on the application, the β value may be constant or variable, and can be set in various ways. In a specific embodiment, the β value is determining according to a set of constant preset values. Based on user input (e.g., vivid level +1, -1, etc.), the β value is selected from the set of values. In another embodiment, the β value is a constant value that is applied to all color pixels. In other embodiments, the β is calculated in different ways as described below.

Figure 4:
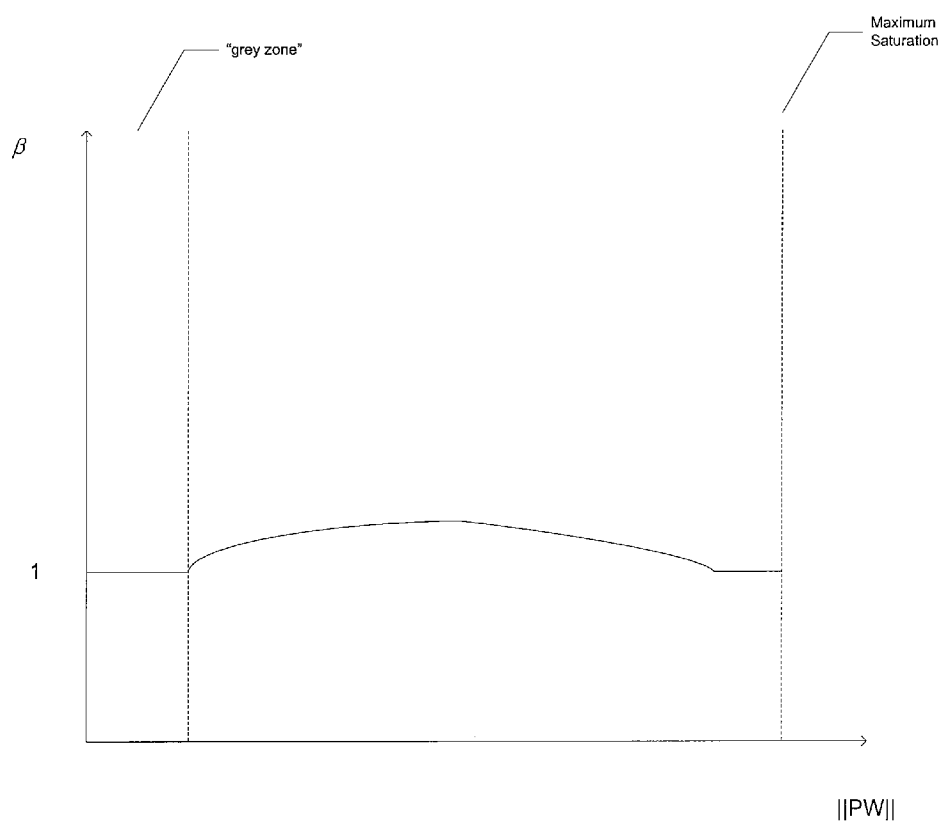
FIG. 4 is a simplified diagram illustrating a method for determining the amount of adjustment to be applied to color saturation level.

In a specific embodiment, the value of β, which translates to the amount of saturation applied, depends on the amount saturation of the point P before any adjustment is applied. FIG. 4 is a simplified diagram illustrating a method for determining the amount of adjustment to be applied to color saturation level. This diagram is merely an example, which should not unduly limit the scope of the claims. One of ordinary skill in the art would recognize many variations, alternatives, and modifications. As an example, the graph in FIG. 4 is used to enhance (or increase) color saturation.

As shown in FIG. 4, the β value largely depends on the value of ||PW|| which can be calculated using the chrominance values. When the value of ||PW|| is close to zero, the color is close to grey. For example, when the color is close to grey, it falls into a grey zone, in which the saturation is near zero. In such case, little or no color adjustment should be applied to the color pixel. For example, increasing saturation of a grey pixel sometimes produces undesirable greenish artifact. As shown, the β value is close or equal to 1 when the color is within a predetermined grey zone. Since the β value is close or equal to 1, minimal or zero color adjustment is performed.

On the other hand, if the value of ||PW|| is close the maximum, it means that the color is already close to saturation before adjustment. To avoid over-saturation and/or artifacts (e.g., clipping) thereof, the amount of adjustment applied to pixel is very little or none. As shown, the β value is close or equal to 1 when the value of ||P|| is close to the maximum saturation level. Since the β value is close or equal to 1, minimal or zero color adjustment is performed.

As shown in FIG. 4, the β value, which translates to the amount of color adjustment, is a function of the ||PW|| value. Depending on the application, the function may be different to suit the specific needs for color adjustment. For example, the curvature shown in FIG. 4 may be increased to bring out more color saturation, or to decreased to bring out less color saturation. In addition, the β value may also determined by other values, such as the Cb value and/or Cr value.

The existing saturation level of a color pixel is not the only factor in determining the β value. In certain embodiments, the color saturation levels of adjacent pixels are also considered to preserve the color continuity and fidelity. In certain embodiments, the β value is determined so that the color adjustment among neighboring pixels are monotonic incremental. That is, if one pixel has a relatively higher saturation level compared different pixel, this one pixel retains the relatively higher saturation level than the other pixel after color adjustments are performed, and vice versa.

It is to be understood that various embodiments of the present invention are flexibly implemented. The β value may be determined using any of techniques described above, or the combination thereof.

In an alternative embodiment, the present invention provides a simplified method in which amount of computation is reduced. This method lowers the priority of preserving the hue values and accepting the insignificant hue change. The new point P' in color space is calculated using the following equations:

$$Cb' = 128 + \beta_b^*(Cb-128); \text{ where } \beta_b > 1 \text{ and } \beta_b = F_1(Cb) \quad \text{(Equation 4A)}$$

$$Cr' = 128 + \beta_r^*(Cr-128); \text{ where } \beta_r > 1, \text{ and } \beta_r = F_2(Cr) \quad \text{(Equation 4B)}$$

For Equations 4A and 4B, $F_1$, $F_2$, ad F are functions to compute $\beta_b$ and $\beta_r$. To further reduce computational costs, the values of $\beta_b$ and $\beta_r$ are set as $\beta_b = \beta_r = F(C)$. It is to be appreciated other computation methods may be derived from the above equations.

In the description of the embodiments above, the adjustment are performed one color pixel at a time. But it is to be understood that the invention has a broad range of applicability. For example, in the 4:2:2 Y'CbCr space, chrominance values are sampled at half of the rate of the luminance value. In this case, a pair of chrominance values is used to represent the color of two horizontal pixels. In this scenario, the color adjustment is performed for this pair of chrominance values. Similarly, such approach can used in other type sampling methods, such as 8:4:4, 4:4:2, 4:2:1, 4:1:1, 4:2:0, and others, where color adjustment is performed for a pair of chrominance values.

Figure 5:
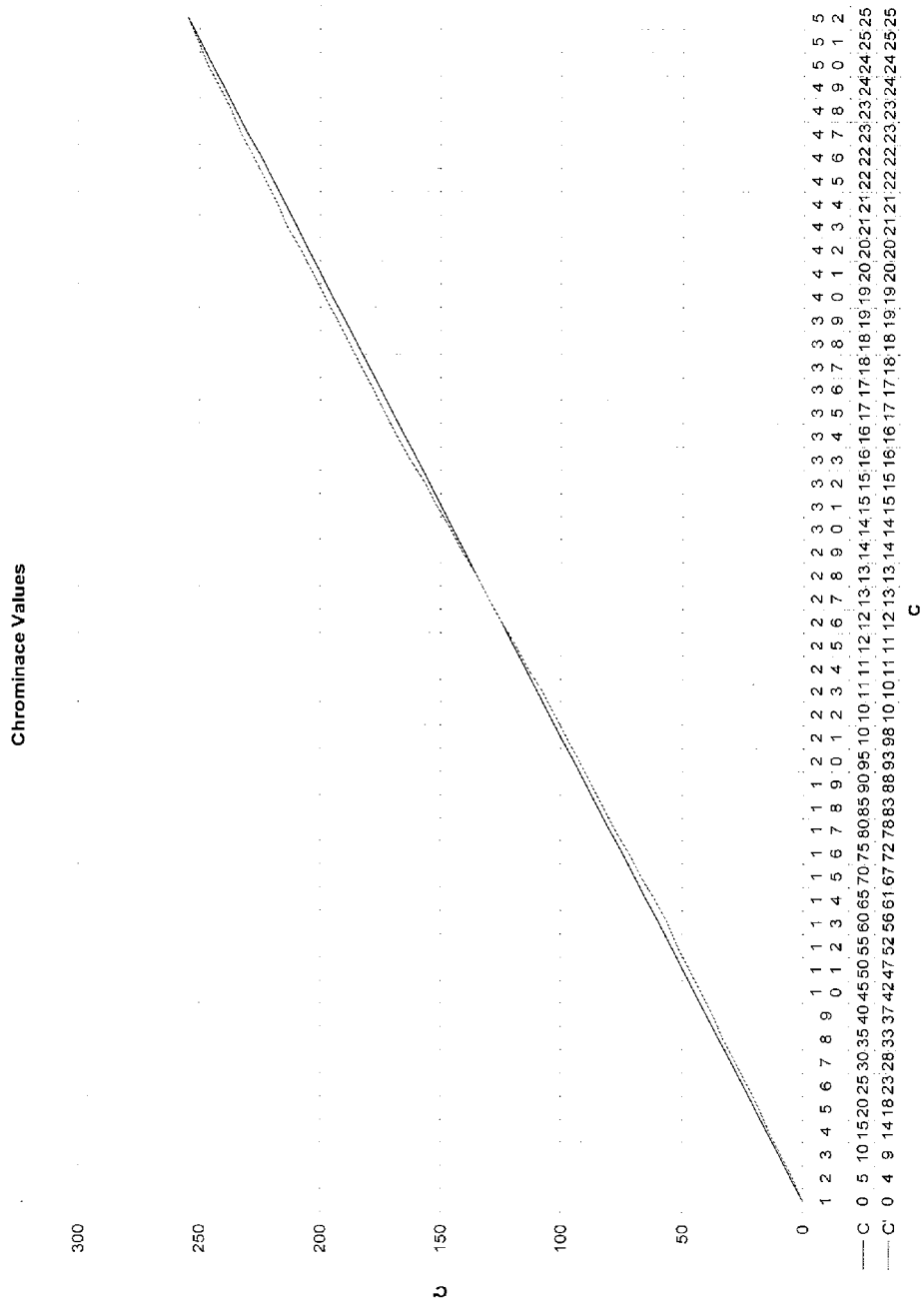
FIG. 5 is a simplified diagram illustrating the use of look up table.

In an alternative embodiment, a lookup table is used to provided the value in lieu of performing computations. FIG. 5 is a simplified diagram illustrating the use of look up table. As shown in FIG. 5, the graph illustrates the relationship between a chrominance values before adjustment (denoted C) and modified chrominance values (denoted C'). As can be seen from the graph, the chrominance values have a possible range of between 0 and 255. Accordingly, for each of the 255 chrominance values, the graph contains a corresponding modified chrominance value. Depending on the application, the modified chrominance value can be determined in many ways. For example, the modified chrominance values are determined using the process describe above (e.g., using Equations 3A and 3B). Once calculated, the modified chrominance values are stored in a table, which may be stored in a data structure. For example, the modified chrominance values are stored in an optimized manner for quick access.

In a specific embodiment, the modified chrominance value is stored in an array structure with a fixed size of 256. For example, to obtain a modified chrominance value from an original chrominance value, it is only necessary to access the array structure. For example, the modified chrominance value is an array C'=a[i], where i is between 0 and 255. To obtain a modified chrominance value based on a chrominance value, it may be as simple obtaining C'=a[C]. It is to be appreciated that by using the table as opposed to computation, the amount of time and resource for enhancing color saturation is improved.

Depending on the application, one or more tables may be used. In a specific embodiment, there are two chrominance value adjustment tables for Cb and Cr respectively. In another embodiments, multiple chrominance value adjustments table are provided to allow user to choose the amount of color enhancement to be performed.

As shown in FIG. 5, the β value largely depends on the value ||PW||, which can be calculated using the chrominance values. In an alternative embodiment, the chrominance value adjustment is independently based on either Cb and Cr value, and the value ||PW|| is not used for the computation of the modified chrominance value. As an example, Cb has a value of 129, and Cr has a value of 240, as they are stored in 8 bits unsigned format. As explained above, an offset of 128 is used. After taking the offset value of 128 into consideration, the new Cb value is 1 and the Cr value is 112. That means Cb component is near the white point and the Cr value is near color saturation. The Cb value is modified by multiplying 1 by a factor of 1.6, while the Cr value is modifying by a factor of 1. The factor for multiplying Cb and Cr is totally based on the value of Cb and Cr after taking offset value into consideration. That, is one of the chrominance value is near white point, the factor is high. Chrominance value is near saturation, the factor is low. Under this scheme, the chrominance value is increased by a relative large amount for chrominance component that is nearly white, and the chrominance value is increased by a relative small amount (or not increased at all) for chrominance component that is nearly saturation. For example, when the chrominance value (after taking the offset of 128 into consideration) has an absolute value of less than 20, the factor of adjustment is 1.6; when the chrominance value has an absolute value of between 20 and 40, the factor of adjustment is 1.5, and when the chrominance value has an absolute value of higher than 110, the factor of adjustment is 1. As an example, FIG. 5 is a simplified graph illustrating the multiplying factor values to be used based on the chrominance value. This diagram is merely an example, which should not unduly limit the scope of the claims. One of ordinary skill in the art would recognize many variations, alternatives, and modifications.

In applications involving videos, techniques according to the present invention are performed for each frame of the video.

The embodiments above can be implemented into various video and image systems. For example, these embodiments may be implemented as software algorithms that are executed when displaying, editing, and/or transmitting videos and images. In certain embodiments, techniques according to the present invention may be hardwired to image and/or video processing chips. It is to be appreciated that many types of image and video systems can benefit from embodiments of the present invention. For example, these system include, but not limited to, personal computer, television, media player, mobile phone, network device, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computing system-implemented method for enhancing color saturation in a computing system programmed to implement the method comprising:
   providing in the computing system, a color image, the color image being defined by a component color space, the component color space being characterized by a luminance component and two chrominance components, the color image including a plurality of pixels, the plurality of pixels including a first pixel being characterized at least by a luminance value, a first chrominance value, and a second chrominance value;
   processing in the computing system, the first chrominance value and the second chrominance value, the first chrominance value and the second chrominance value being characterized by a ratio;
   determining in the computing system, a saturation level using based on a magnitude of the first chrominance value and the second chrominance value and an offset value;
   calculating in the computing system, a factor for adjusting the first chrominance value and the second chrominance value, the factor being based on the saturation level, wherein a factor associated with a first pixel may be different from a factor associated with a second pixel, the factor being 1 when saturation level is below a first threshold or above a second threshold; and
   adjusting in the computing system, the first chrominance value and the second chrominance value using the factor, the adjusted first chrominance value and the second chrominance value being maintaining the ratio.

2. The method of claim 1 further comprising modifying in the computing system, the first chrominance value and the second chrominance value by an offset value.

3. The method of claim 2 wherein the offset value is 128.

4. The method of claim 1 further comprising:
   analyzing in the computing system, the second pixel, the second pixel being adjacent to the first pixel;
   determining in the computing system, chrominance information associated with the second pixel;
   wherein the factor is further based on the chrominance information.

5. The method of claim 1 further comprising preserving in the computing system, the luminance value.

6. The method of claim 1 wherein the component color space is a YUV 2 color space, a YCbCr color space, or a YIQ color space.

7. The method of claim 1 further comprising processing in the computing system, a digital video, the digital video including the color image.

8. The method of claim 1 wherein the component color space is a YCbCr space.

9. The method of claim 8 wherein the first chrominance value is associated with a Cb value, and the second chrominance value is associated with a Cr value.

10. The method of claim 1 wherein determining in the computing system, a saturation level comprises calculating in the computing system, a magnitude using the first chrominance value and the second chrominance value.

11. The method of claim 1 wherein the factor is greater than or equal to 1.

12. The method of claim 11 wherein the adjusting in the computing system, the first chrominance value and the second chrominance value comprises multiplying in the computing system, the first chrominance value and the second chrominance value by the factor.

13. The method of claim 1 wherein the factor is close to 1 if the saturation level is determined to be close to a border of the component color space.

14. A computing system-implemented method for enhancing color saturation in a computing system programmed to implement the method comprising:

providing a color image, the color image being defined by a component color space, the color image including a plurality of pixels, the plurality of pixels including a first pixel being characterized at least by a luminance value, a first chrominance value, and a second chrominance value;

processing in the computing system, the first chrominance value and the second chrominance value;

determining in the computing system, a saturation level using based on the first chrominance value and the second chrominance value;

calculating in the computing system, a factor for adjusting the first chrominance value and the second chrominance value, wherein the factor is variable and determined in response to the first chrominance value and the second chrominance value;

subtracting in the computing system, the first chrominance value and the second chrominance value by an offset value; and multiplying in the computing system, the first chrominance value and the second chrominance value by the factor, the factor being 1 when saturation level is below a first threshold or above a second threshold.

15. The method of claim 14 further comprising determining in the computing system, whether the first pixel has a saturation near zero, wherein the factor is 1 if the first pixel has a saturation near zero.

16. The method of claim 14 further comprising determining in the computing system, a distance from a white point of the component color space.

17. The method of claim 14 wherein the factor is associated with a second pixel, the second pixel being within a proximity of the first pixel.

18. The method of claim 14 further comprising determining a hue, the hue being associated with a ratio between the first chrominance value and the second chrominance value.

19. The method of claim 14 wherein the offset value is 128.

20. A computing system-implemented method for enhancing color saturation in a computing system programmed to implement the method comprising:

providing in the computing system, a color image, the color image being defined by a component color space, the component color space being characterized by a luminance component and two chrominance components, the color image including a plurality of pixels, the plurality of pixels including a first pixel being characterized at least by a luminance value, a first chrominance value, and a second chrominance value, first and second chrominance values having a range of between 0 and 255;

calculating a factor for saturation adjustment in a computer system, the factor being 1 when saturation level is below a first threshold or above a second threshold;

providing in the computing system, a first chrominance value adjustment table, the first chrominance value adjustment table including at least 256 values, the 256 values being predetermined based on at least a first parameter, the 256 values being corresponding the range of chrominance values, wherein the factor is variable and determined in response to the first chrominance value and the second chrominance value;

determining in the computing system, a third chrominance value based on the first chrominance value using the first chrominance value adjustment table;

determining in the computing system, a fourth chrominance value based on the second chrominance value using the first chrominance value adjustment table.

21. The method of claim 20 further comprising modifying in the computing system, the first chrominance value by an offset value of 128.

22. The method of claim 20 further comprising:
creating in the computing system, a data structure for storing the first chrominance value adjustment table;
determining in the computing system, the third chrominance adjustment value by multiplying the first chrominance value and an adjustment factor, the adjustment factor having a range of between 1 and 2.

23. The method of claim 20 further retrieving in the computing system, the third chrominance value from the first chrominance value adjustment table based on the first chrominance value.

24. The method of claim 20 further comprising:
providing in the computing system, a plurality of chrominance value adjustment tables, the plurality of chrominance value adjustment tables including the first chrominance value adjustment table;
selecting in the computing system, the first chrominance value adjustment table.

25. The method of claim 20 further comprising selecting in the computing system, the first chrominance adjustment table.

26. The method of claim 20 further comprising displaying in the computing system, the color image.

27. The method of claim 20 wherein the color image is a frame of a video file.

28. The method of claim 20 wherein the first chrominance adjustment table is stored in an array data structure.

29. The method of claim 20 further comprising rendering in the computing system, the color image.

* * * * *